Nov. 28, 1933.     C. A. BICKEL     1,937,400
MACHINE TOOL
Filed Feb. 3, 1932     13 Sheets-Sheet 1
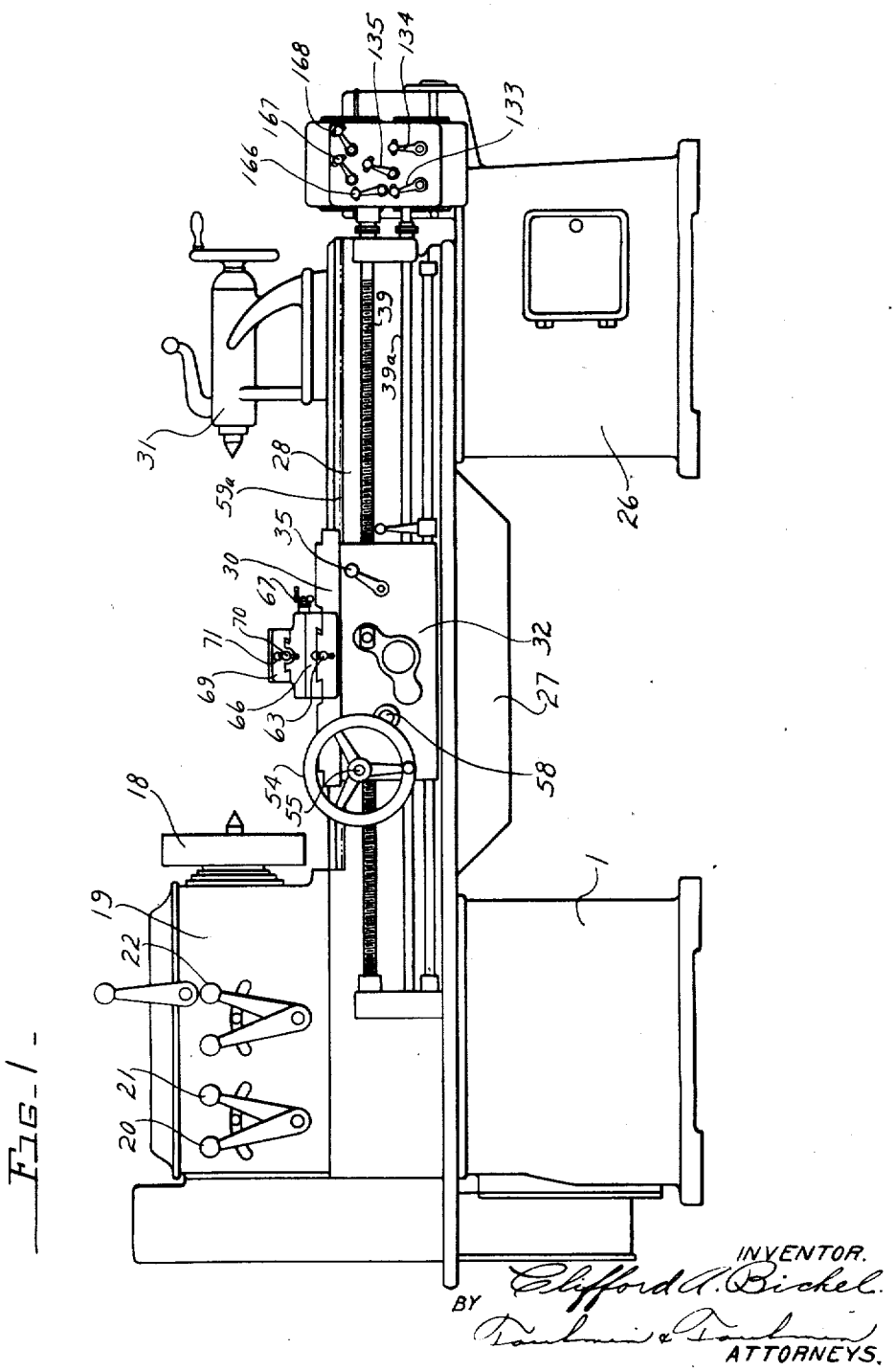

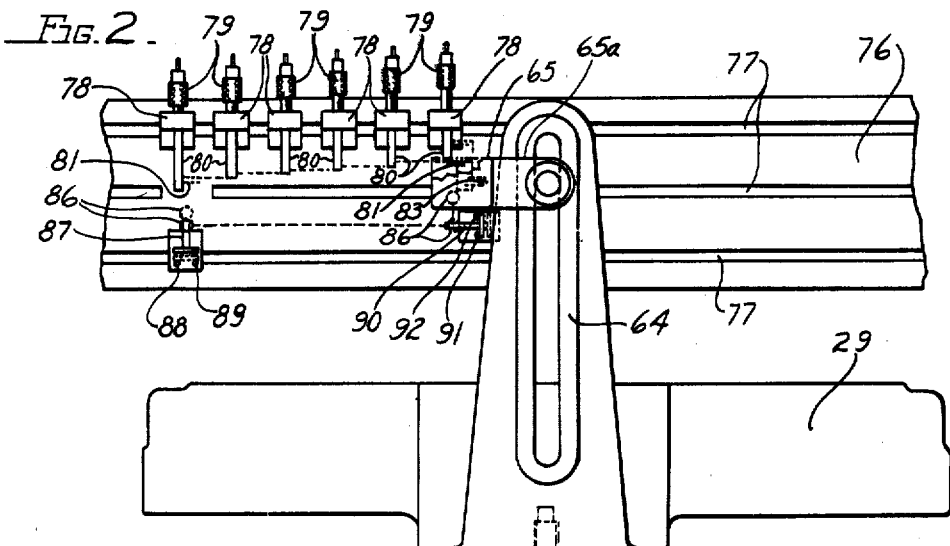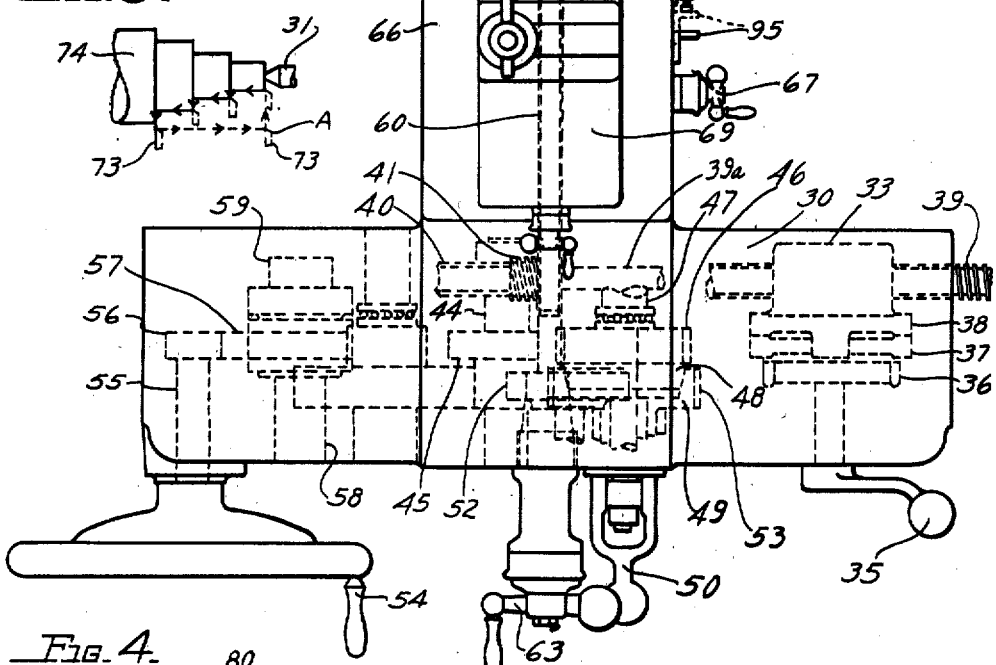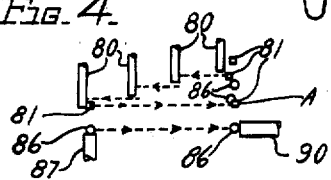

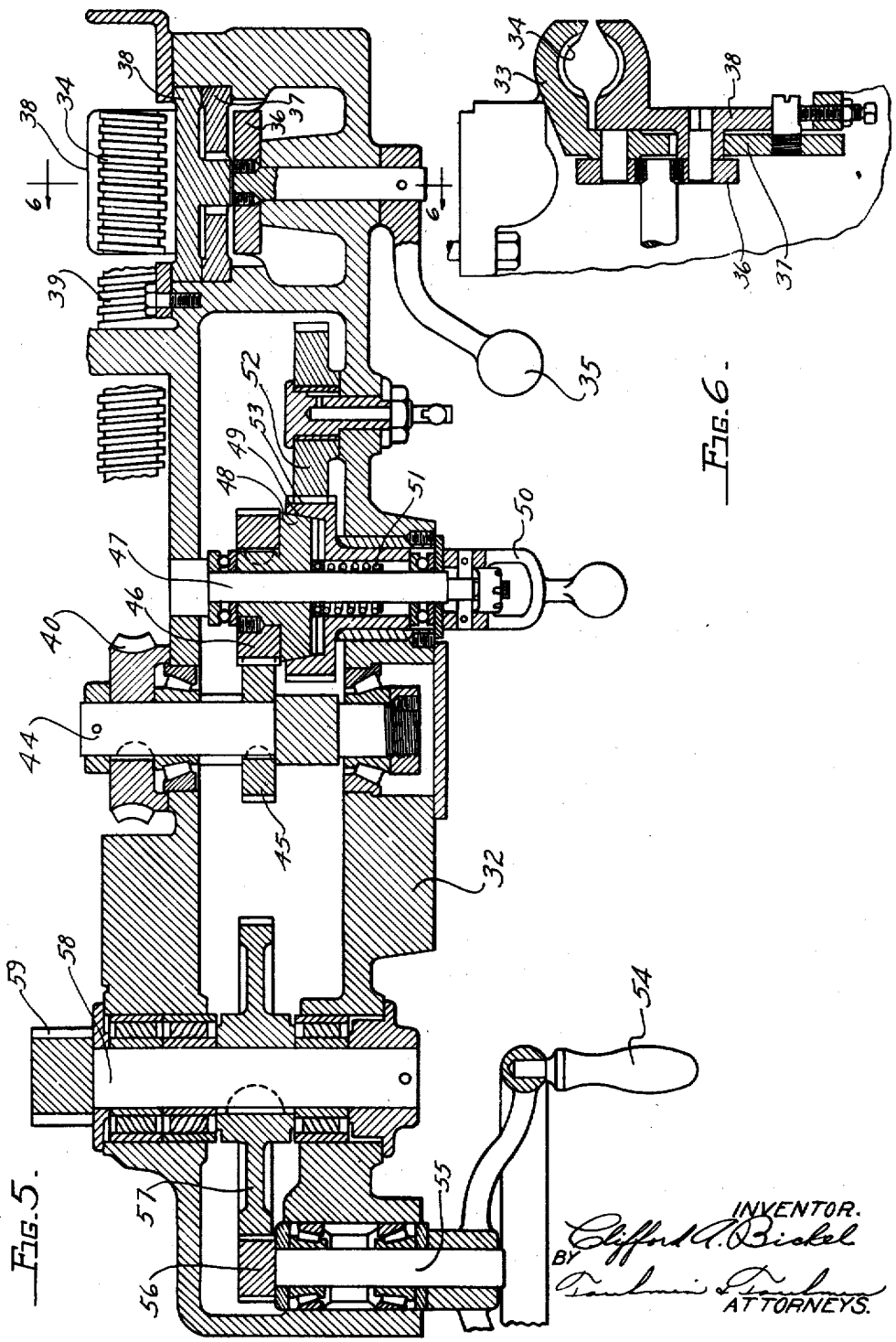

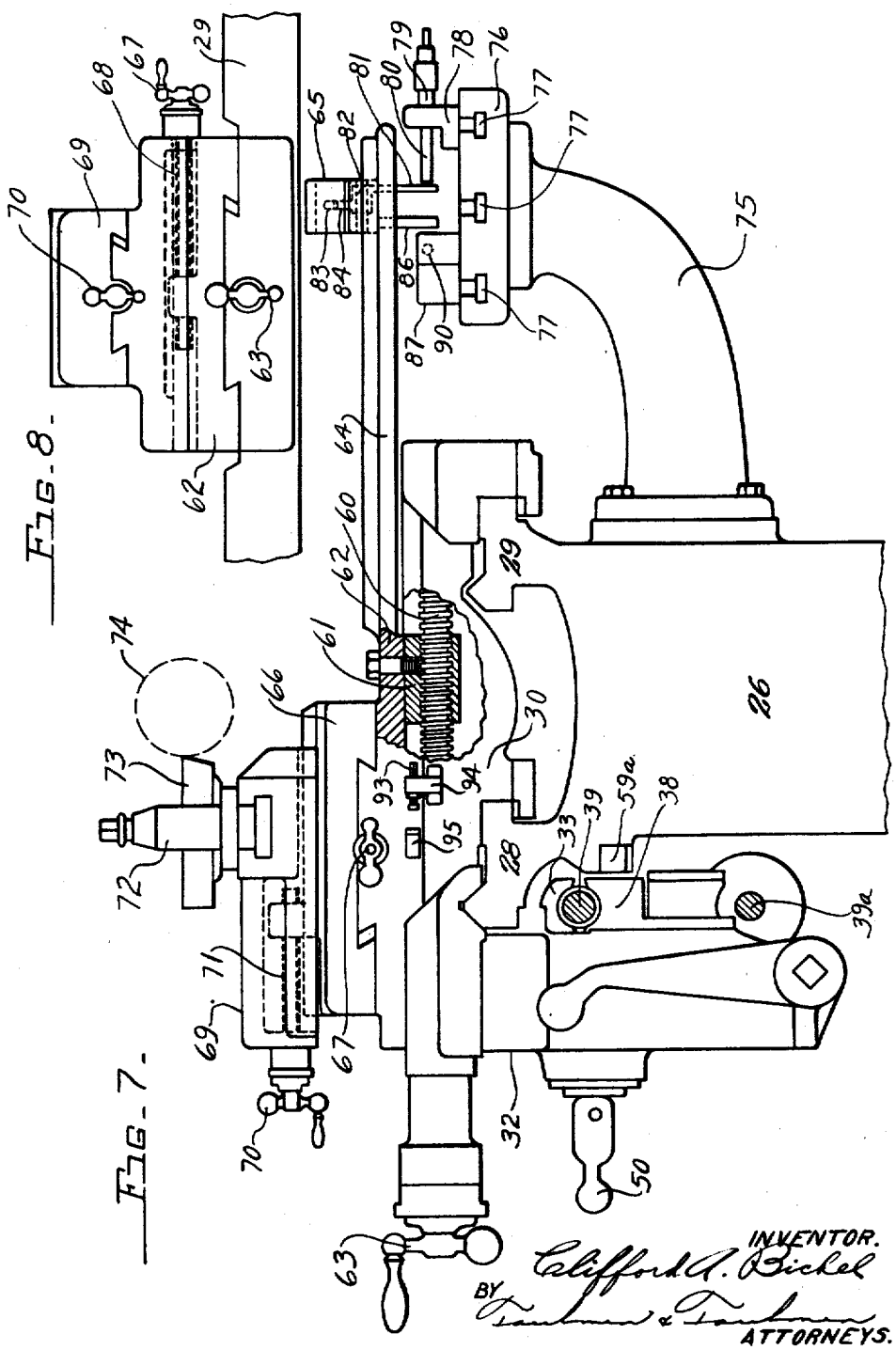

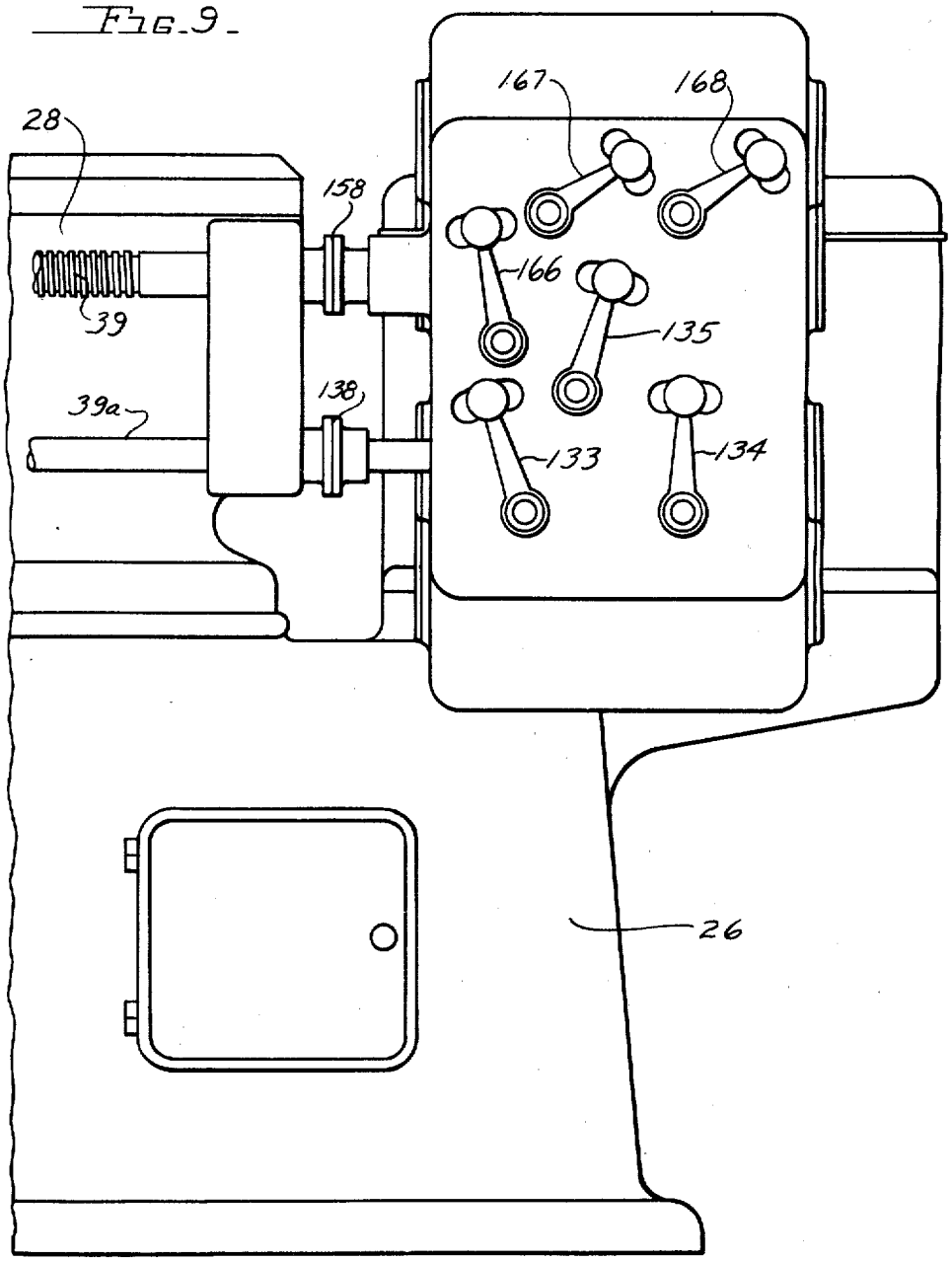

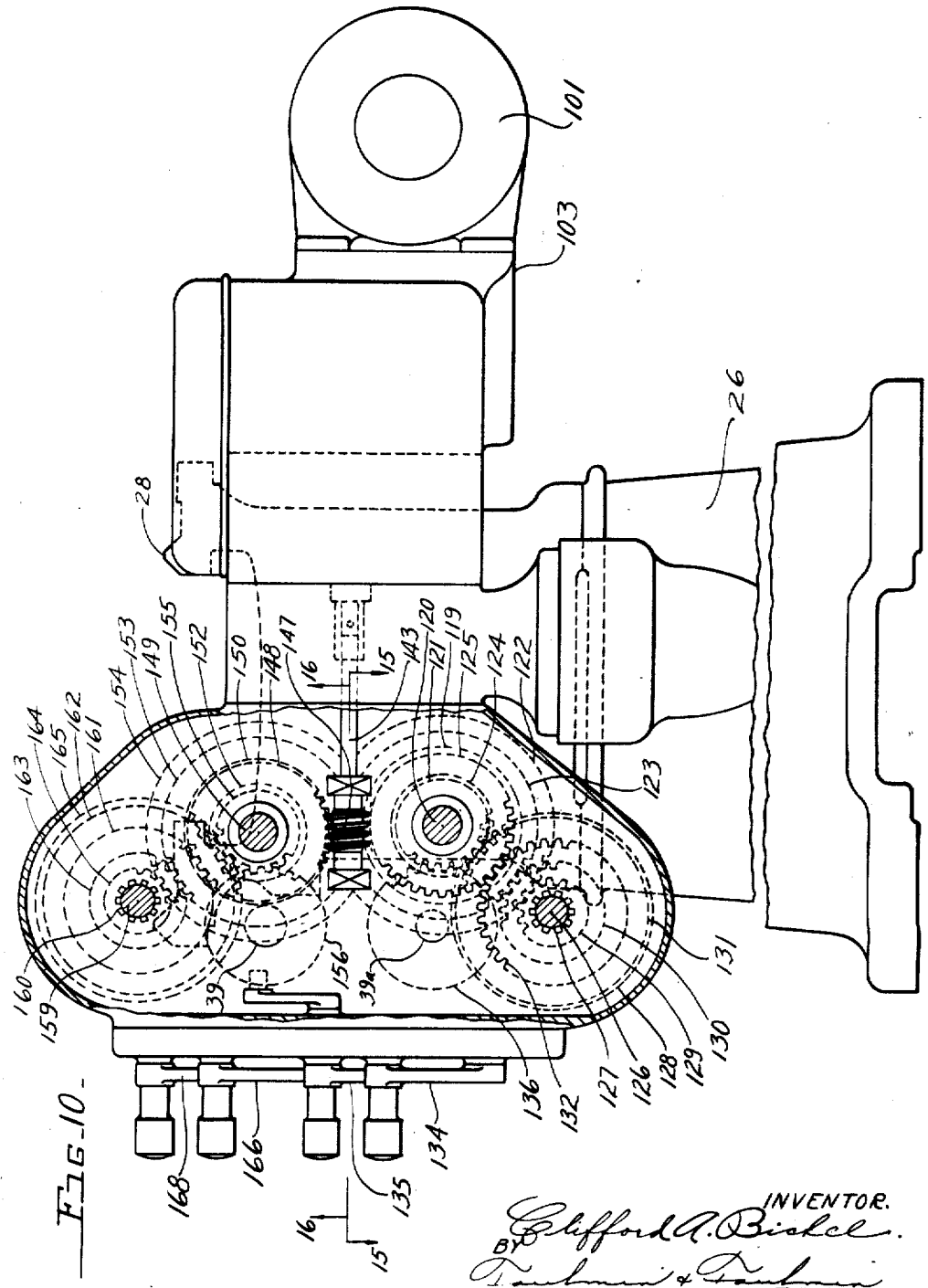

Nov. 28, 1933.  C. A. BICKEL  1,937,400
MACHINE TOOL
Filed Feb. 3, 1932   13 Sheets-Sheet 7

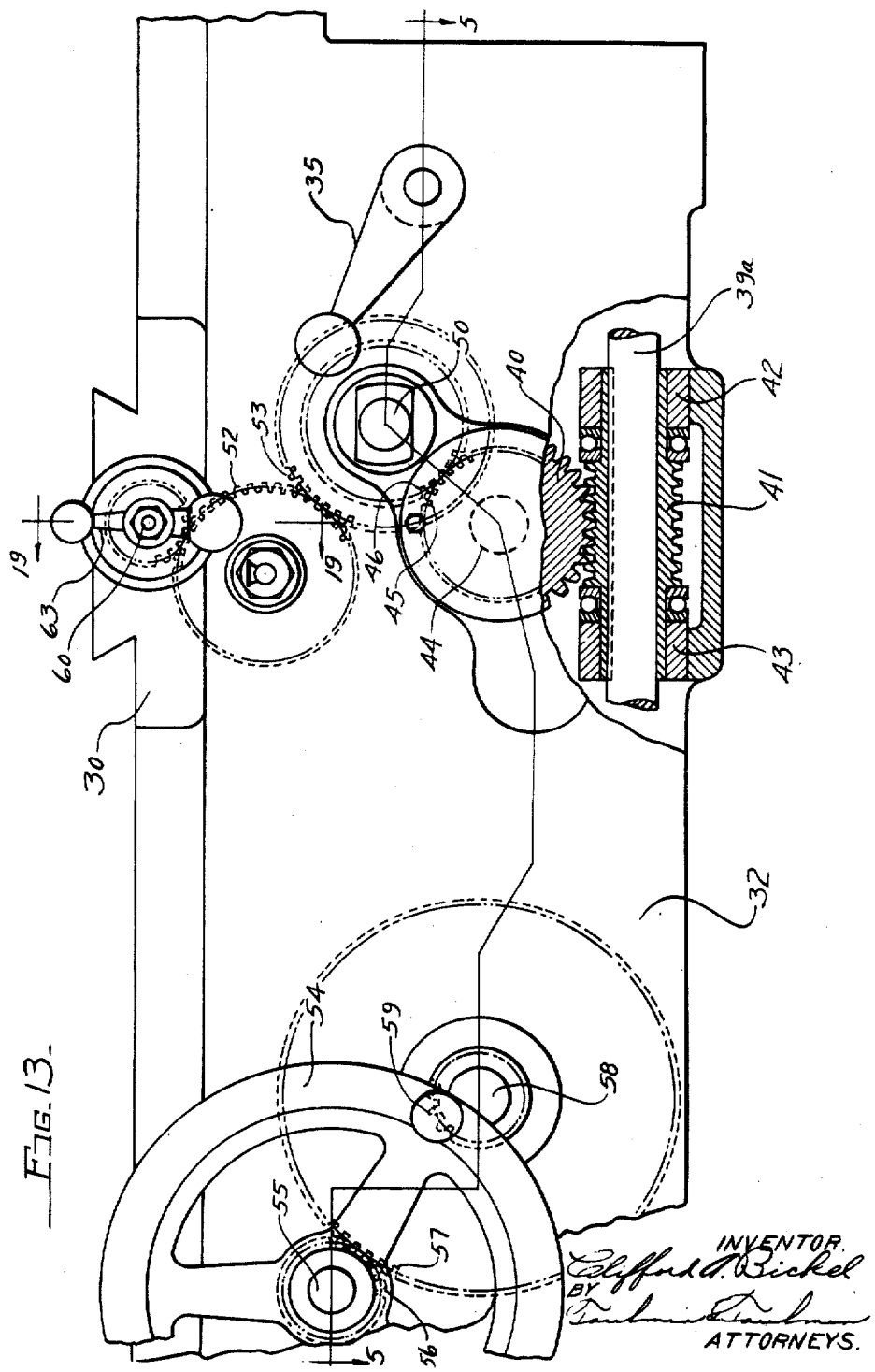

Nov. 28, 1933.                C. A. BICKEL                1,937,400
                              MACHINE TOOL
                     Filed Feb. 3, 1932        13 Sheets-Sheet 9
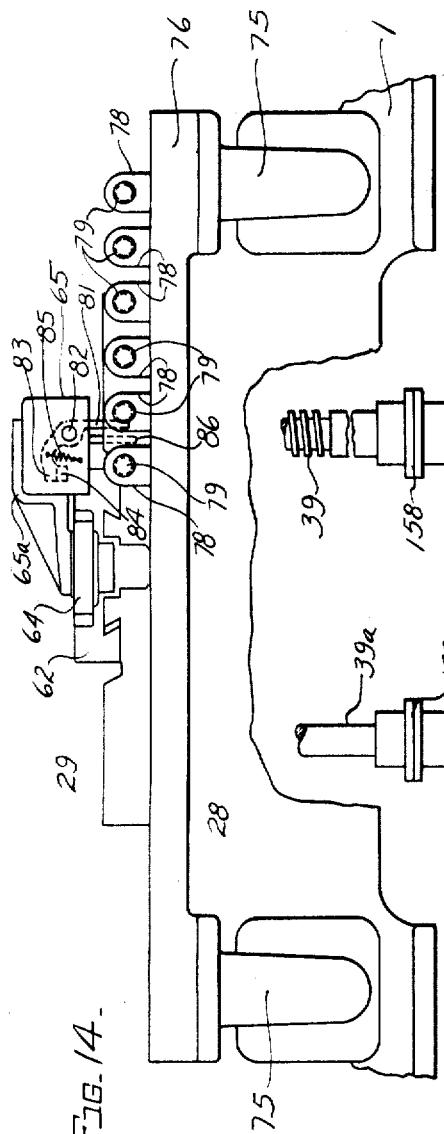
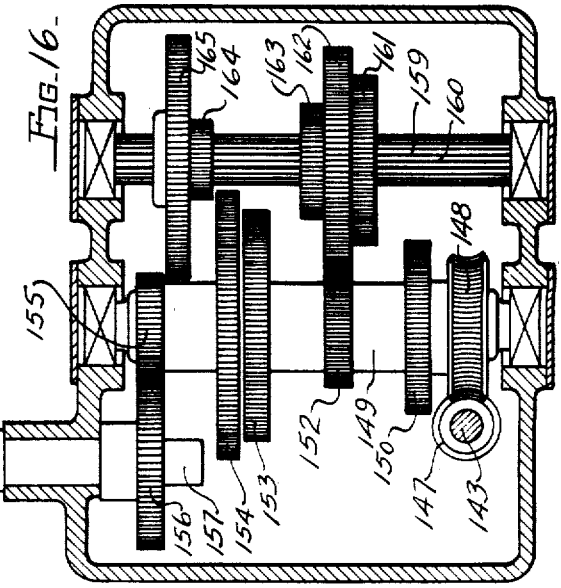
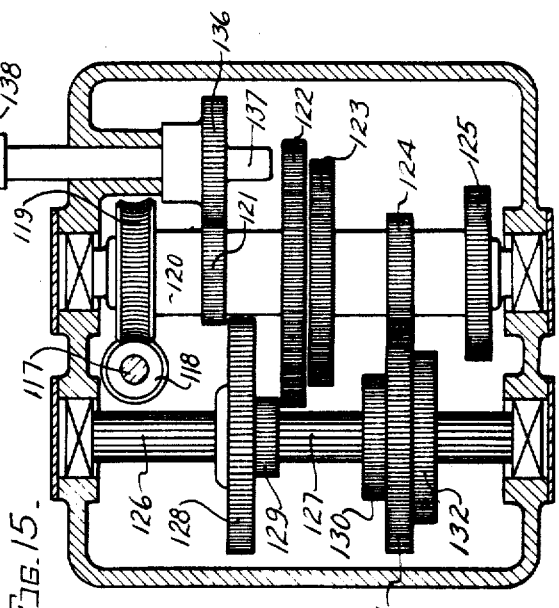

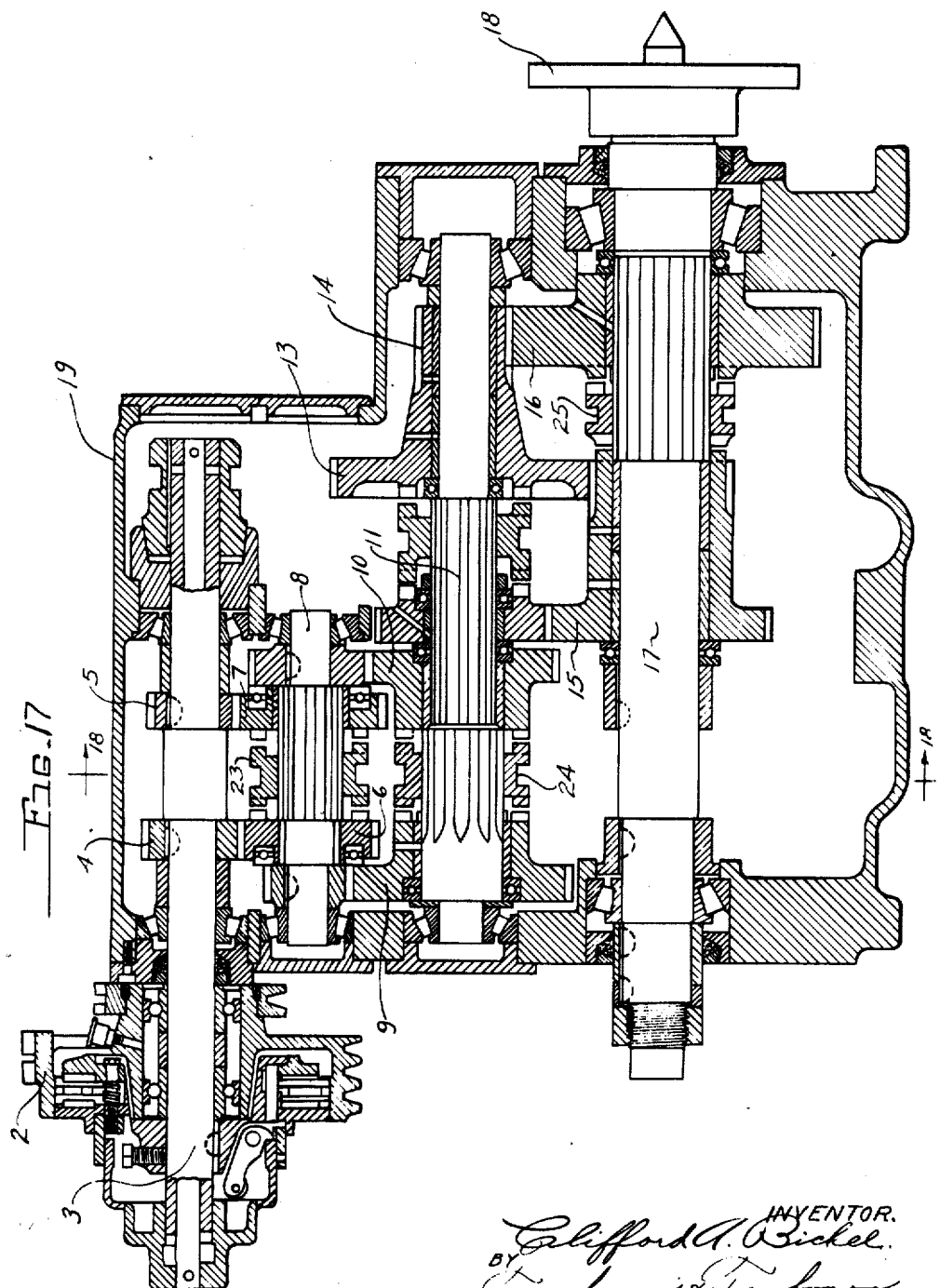

Nov. 28, 1933.   C. A. BICKEL   1,937,400
MACHINE TOOL
Filed Feb. 3, 1932   13 Sheets-Sheet 11
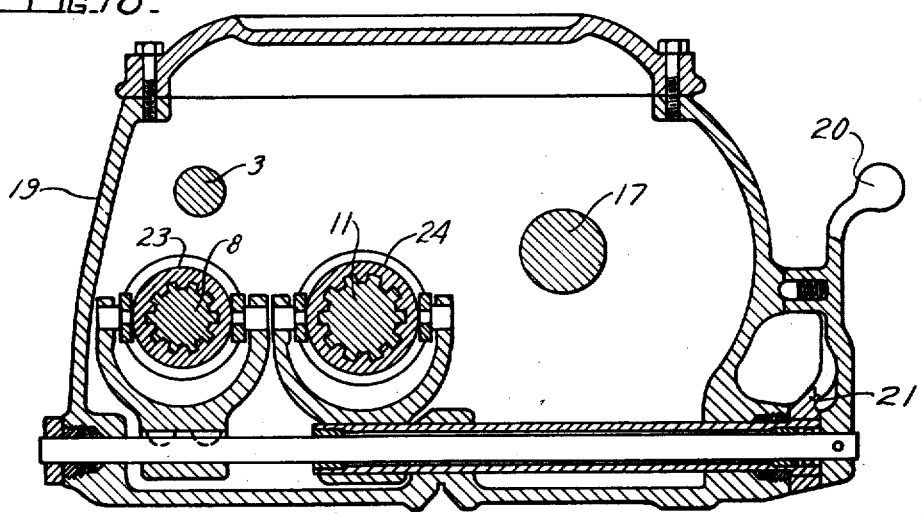
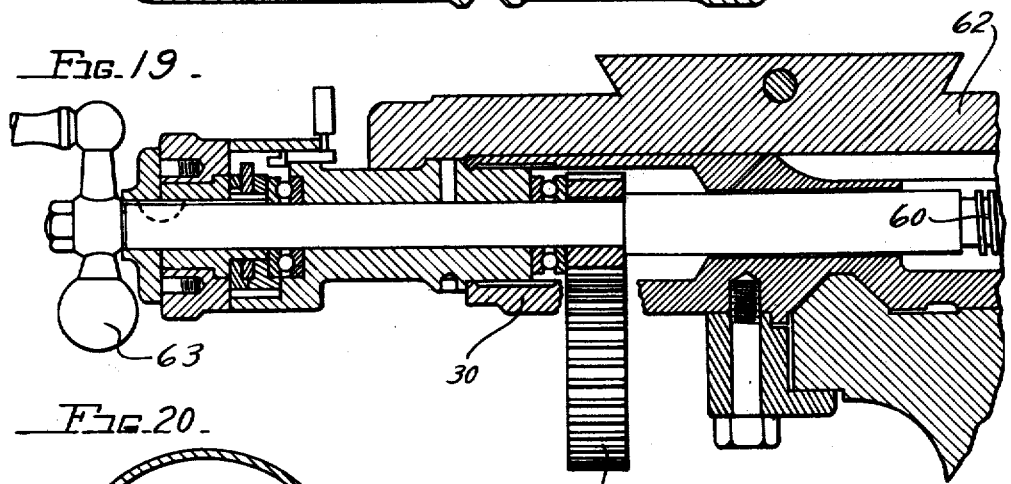
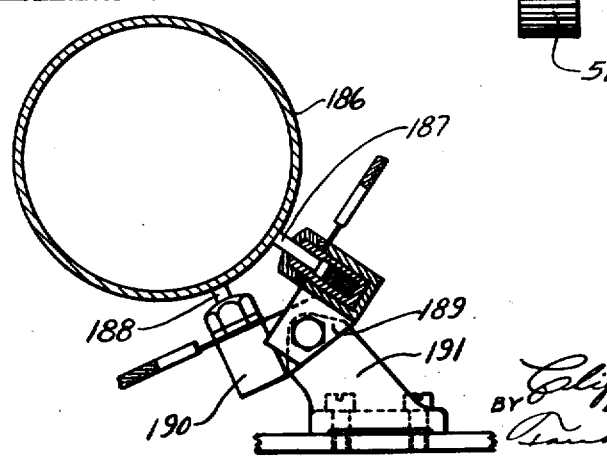

Nov. 28, 1933.  C. A. BICKEL  1,937,400
MACHINE TOOL
Filed Feb. 3, 1932  13 Sheets-Sheet 12
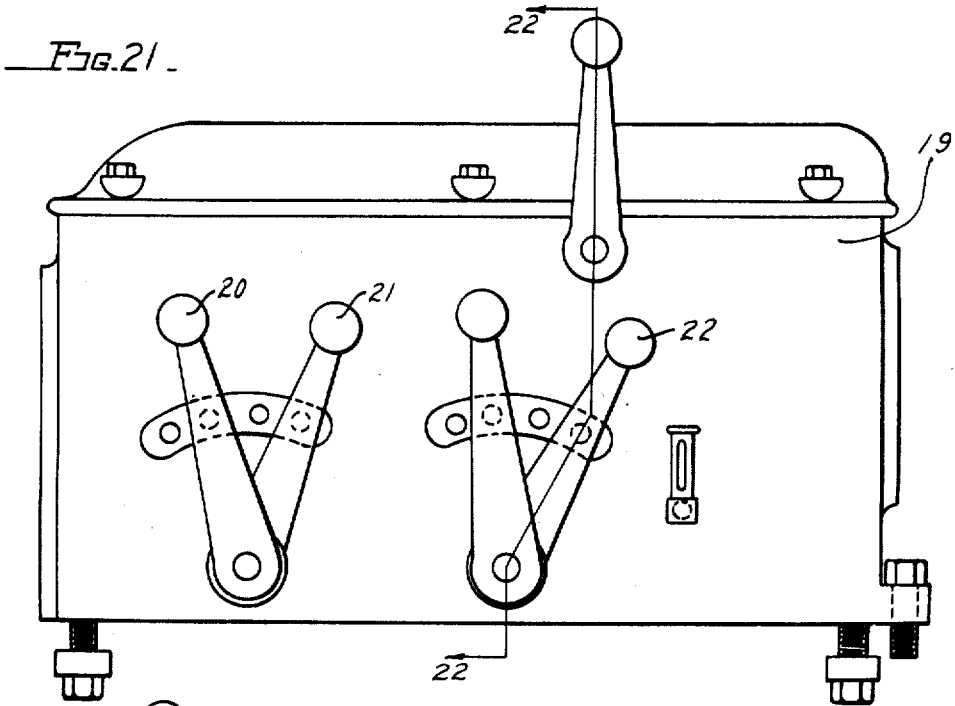
_Fig. 21_
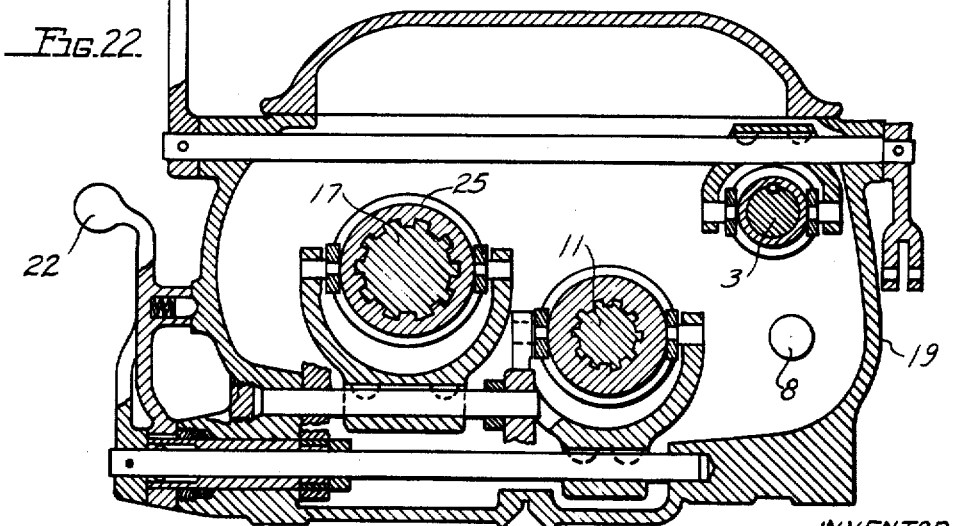
_Fig. 22_

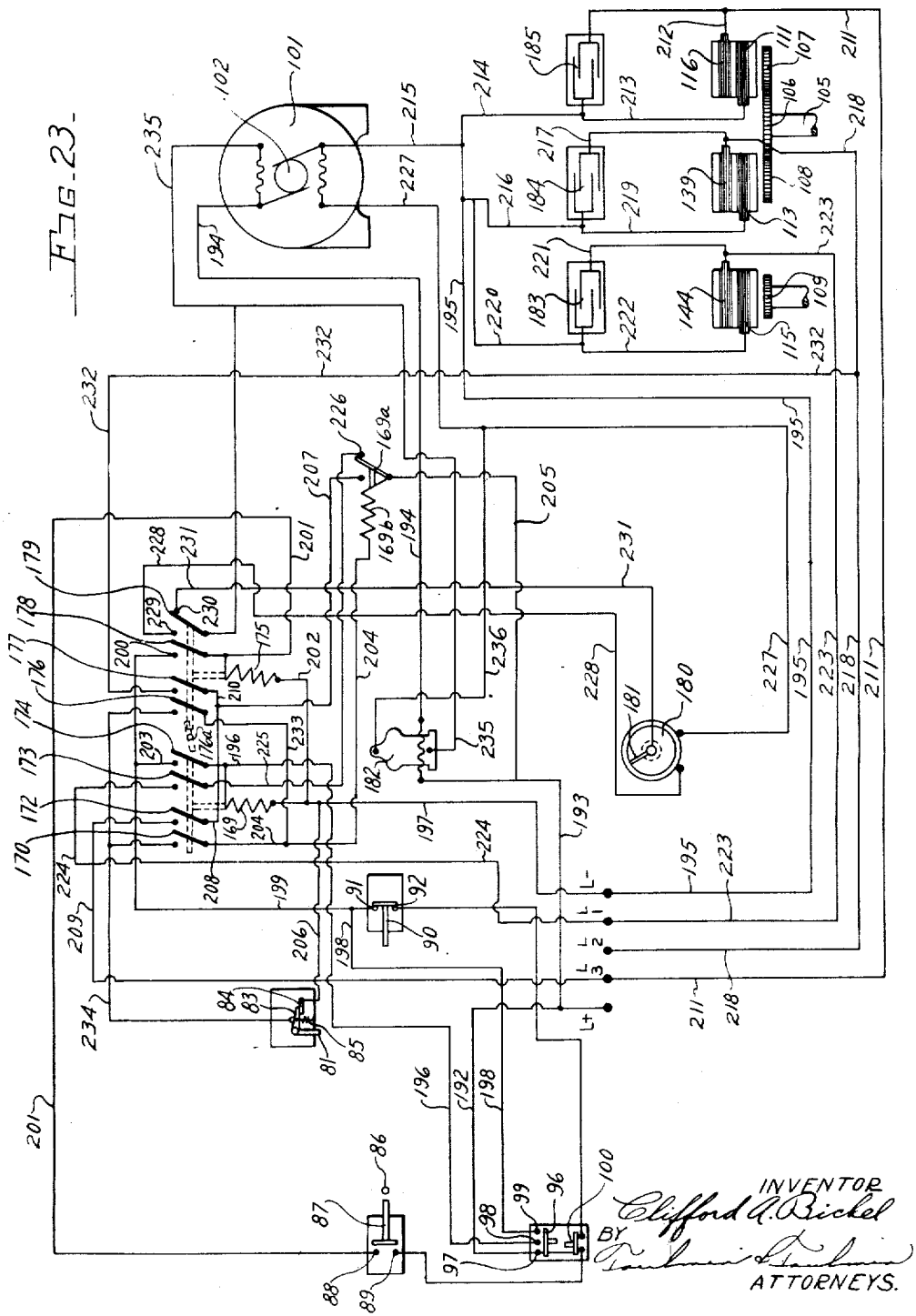

Patented Nov. 28, 1933

1,937,400

UNITED STATES PATENT OFFICE 1,937,400

MACHINE TOOL

Clifford A. Bickel, Sidney, Ohio, assignor to The Monarch Machine Tool Company, Sidney, Ohio, a corporation of Ohio Application February 3, 1932. Serial No. 590,665

34 Claims. (Cl. 82—21)

My invention relates to a machine tool and, in particular, to lathes and a method of controlling the application of a tool to a work piece and a lathe.

It is my object to provide a lathe in which the tool can be applied to the work and will automatically form the work, cut the work with different faces and different diameters, will then withdraw from the work and return to its initial position without attention by the operator after having once been initiated in its cycle of operations.

It is an object of my invention to provide means of adjusting by a plurality of micrometer stops the cutting steps that are automatically performed by the tool on the work piece and by switches actuated by the stops and other switches for controlling the carriage movement I am enabled to apply the tool as desired to cut the work piece according to the setting of the stops.

In particular, it is my object to provide a machine of the character described having a single motor for the movement of the carriage to and from the work and along the work.

Referring to the drawings:

Figure 1 is a front elevation of the tool;

Figure 2 is a top plan view of that portion of the tool comprising the carriage, the back frame, the stops and switch mechanism;

Figure 3 is a diagrammatic view showing the position of the tool at successive stages as it cuts a shaft to varying diameters;

Figure 4 is a diagrammatic view showing the position of the stops and switches at different stages of operation to move the tool to cut the work, as indicated in Figure 3;

Figure 5 is a section on the line 5—5 of Figure 13;

Figure 6 is a section on the line 6—6 of Figure 5;

Figure 7 is an end elevation of a machine partially in section;

Figure 8 is a detail end elevation of the cross slides on the carriage;

Figure 9 is a detail end elevation of one side of the lathe showing the exterior of the gear shift mechanism of the lead screw gear box;

Figure 10 is an end elevation partially in section showing the driving mechanism from the magnetic clutch box for driving the carriage in different directions and at different speeds from the single motor control by the magnetic clutches which are in turn controlled by the stop actuated clutches;

Figure 13 is a detail front elevation of the apron of the carriage partially broken away to show a part of the actuating means for moving the carriage;

Figure 14 is a rear elevation of the tool;

Figure 15 is a section on the line 15—15 of Figure 10;

Figure 16 is a section on the line 16—16 of Figure 10;

Figure 17 is a section through the head stock gear box;

Figure 18 is a section on the line 18—18 of Figure 17;

Figure 19 is a section on the line 19—19 of Figure 13;

Figure 20 is a section on the line 20—20 of Figure 12 showing the arrangement of brushes for conveying current to and from a magnetic clutch;

Figure 21 is an exterior view of the change gear box of the head stock;

Figure 22 is a section on the line 22—22 of Figure 21;

Figure 23 is a wiring diagram showing the arrangement of switches, magnetic clutches and carriage operating motor.

Figure 11:
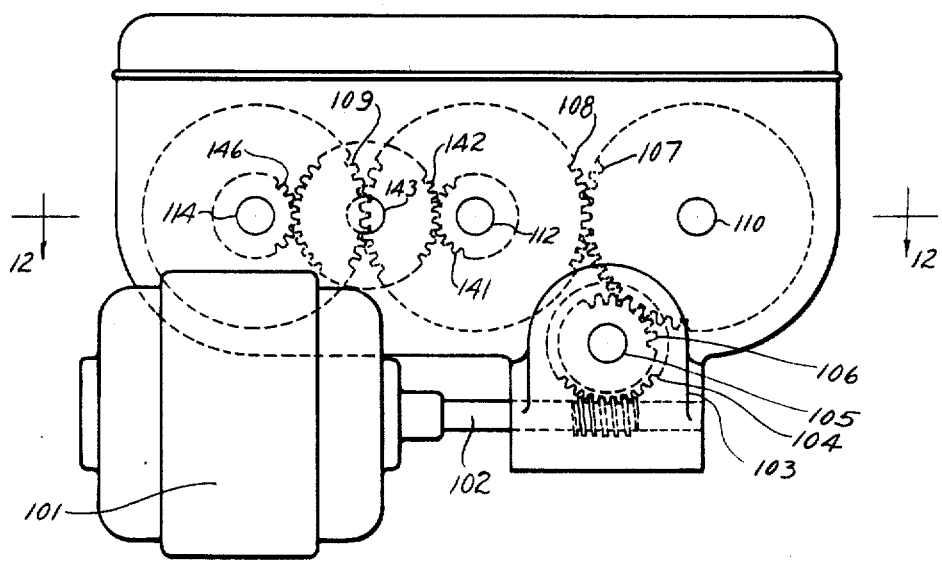
Figure 11 is a rear elevation of the motor and gear box housing which is used to drive the carriage.
Figure 12:
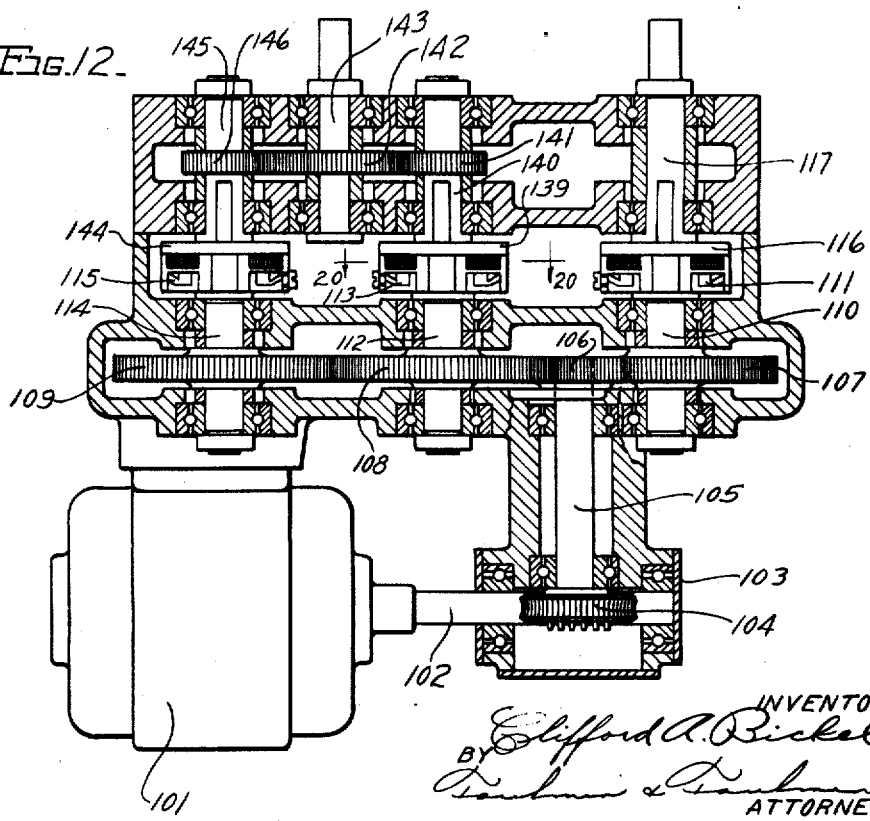
Figure 12 is a section on the line 12—12 of Figure 11.

Referring to the drawings in detail, 1 indicates the pedestal which contains the spindle driving motor which operates the pulley 2, spindle drive shaft 3, gears 4, 5, 6 and 7, shaft 8, gears 9 and 10, shaft 11, gears 13 and 14 on shaft 11 and gears 15 and 16 on the spindle shaft 17 carrying the head stock spindle 18. The head stock gear box casing 19 carries on the exterior the shift levers 20, 21 and 22 which actuate the clutches 23, 24 and 25 in the usual manner.

26 indicates the other leg of the tool, which leg 1 carries therebetween the pan 27 and the spaced bed members 28 and 29 which carry between them on suitable guideways the carriage 30. 31 indicates the tail stock.

Carriage construction

The carriage 30 is provided with an apron 32. On the right hand side of the apron is a clamping nut 33 internally threaded at 34 which is actuated by the handle 35 through the clutch members 36, 37 and 38. This nut engages the lead screw 39.

The apron has a feed rod 39a which engages the worm wheel 40 through its worm 41 carried between the shoulders 42 and 43 on the apron 32.

The worm wheel 40 is mounted on the cross shaft 44 and carries a gear 45 meshing with the gear 46 on the shaft 47. Part of this gear is formed into a male clutch member 48 which engages with the interior of the female clutch member 49. The female clutch member 49 is actuated into engagement by the handle 50 against the spring 51. The gear 52 is driven by the gear 53 on the female clutch member 49. Longitudinal movement of the carriage by hand is effected by the hand wheel 54, shaft 55, gears 56 and 57, shaft 58 and gear 59 engaging the rack 59a carried on the tool bed 28. The gear 52 actuates the cross slide screw 60 which is threaded through the block 61 carried on the under side of the cross slide 62. A hand adjustment of this screw is effected through the handle 63. The carriage carries a slotted arm 64 in which is adjustably mounted the switch box 65. Mounted upon the cross slide 62 is a longitudinal tool slide 66 actuated by the hand lever 67 and screw 68. Mounted on the longitudinal tool slide is a transverse tool slide 69 actuated by the handle 70 and screw 71. This in turn carries a tool holder 72 and tool 73 which engages with the work piece 74.

Bolted on the rear side of the tool bed is a bracket 75 having a slotted bed 76. Mounted in the slots 77 in the face of 76 are a plurality of brackets 78 carrying micrometer screws 79 having pins 80 mounted transversely of 76 so that these pins project inwardly at varying distances according to the depth of cut desired by the tool 73 into the work 74. The pins are used for the purpose of engaging the depending switch arm 81 which is pivoted at 82 and has a contact arm 83 engaging the stationary contact 84.

This switch lever comprising arms 81 and 83 is yieldingly held in contact-making position by the spring 85. The switch box 65 which carries the contact members and the pivotal support of the levers 81 and 83 is mounted adjustably as described on a bracket 65a on the slotted end of the cross slide 64.

As the carriage proceeds to the left hand during operation the switch arm 81 successively engages the projecting pins 80 so that the circuit is open for a sufficient period of time to permit the carriage to come to rest in its longitudinal movement and to permit the cross slide to be withdrawn a suitable distance or advanced as the case may be in order to make a new adjustment of the tool with respect to the work as determined by the length of the projecting stop pin 80.

Carried on the switch box 65 is a depending stationary pin 86 which is a limit switch operating pin. This pin at the end of the left hand movement of the carriage and tool slide engages the switch member 87 which is normally open but which, upon engagement by the pin 86, bridges the contacts 88 and 89, whereupon the carriage is returned to the right hand position. The pin 86 also is used for opening the normally-closed switch member 90 which bridges the terminals 91 and 92 for a purpose and in a manner hereinafter described in connection with the operation of the system.

Referring to Figure 3, it will be noted that the path of the tool is as indicated in dotted lines with the arrows.

The tool is brought up to the work at the initial position shown at A so that the screw 93 carried in the bracket 94 on the carriage engages with the bracket stop 95 on the cross slide. This movement is effected through the handle 63. The lever 50 is then actuated to engage the friction surfaces 48 and 49 and the push button starter 96 is pushed in to bridge the terminals 97, 98 and 99. Associated with the starter button is a stop button 100, the function of which will be hereinafter described.

*Carriage and cross slide drive mechanism*

The motor 101 (a variable speed direct current motor) operates the worm shaft 102 in the box 103 which actuates the worm wheel 104 on shaft 105 carrying the pinion 106 in mesh with the gear 107 which meshes with gear 108, this gear driving gear 109. Gear 107 drives shaft 110 and half of the magnetic clutch 111. Gear 108 is mounted on shaft 112 which drives one-half of the magnetic clutch 113. Gear 109 is mounted on shaft 114 and drives one-half of the magnetic clutch 115. The other half of the magnetic clutch 111 designated 116 is mounted on the shaft 117. The shaft 117 drives the feed rod 39a through the following mechanism.

The shaft 117 carries a worm 118 which meshes with a worm wheel 119 which is fastened on the shaft 120 on which is mounted a loose gear 121. Mounted on this shaft and attached to gear 121 is the loose gear 122, fixed gear 123, fixed gear 124 and fixed gear 125.

Parallel to the shaft 120 is a shaft 126 having a pair of shiftable gears which are fastened thereon by a spline 127, such gears being designated 128 and 129. There is also mounted on this shaft 3 gears that are fastened thereon but are arranged for lateral movement comprising the gears 130, 131 and 132. These gears are shifted by suitable gear shift levers 135 and 134 while the gear 136 is shifted by the lever 133.

Gear 121 is adapted to mesh with gear 136 on the shaft 137 which is coupled by the coupling 138 to the feed rod 39a.

Returning to the driving motor 101 and its associated gears, the lead screw 39 is driven as follows in alternate directions for left hand longitudinal movement and rapid return longitudinal movement. The clutch member 113 has a companion clutch member 139 mounted on the shaft 140 that carries the gear 141 meshing with the gear 142 on the shaft 143. Clutch 115 has a companion member 144 mounted on the shaft 145 carrying the gear 146 meshing with the gear 142. The shaft 143 carries on it a worm 147 engaging with the worm gear 148 on the shaft 149. The gear 148 is fastened on this shaft. Likewise, gears 150, 152 and 153 are fastened on the shaft 149, while gear 154 is loose as is also gear 155 which is integral with gear 154 and meshes with gear 156 on the shaft 157 that is coupled at 158 to the lead screw 39.

A parallel splined shaft 159 having a spline 160 carries the group of slidable gears 161, 162 and 163 that rotate with the shaft and a second group of slidable gears 164 and 165 rotating with the shaft 159, which gears are shifted by suitable gear shift levers 166, 167 and 168.

Accordingly, magnetic clutch members 111 and 116 control the longitudinal feed to the left until the switch 83 breaks contact by engagement with the first pin 80. When that switch opens, it demagnetizes the magnetic clutch 111—116 and permits the energization of clutch 115—144 to cause the tool to feed out until the switch arm 81 falls off of the pin 80 permitting of the closing of the contacts 83 and 84 which again permits the energization of clutch 111—116 for longitudinal left hand feed.

When the last pin 80 is engaged by the arm 81 opening contacts 83 and 84 the carriage travels outwardly until switch 87 closes contacts 88 and 89 releasing clutch members 115—144 (that is, deenergizing them) and energizing clutch members 113 and 139 for feeding the carriage to the right which is a rapid longitudinal return that continues until the pin 86 which has been used to close switch 87 engages the switch 90 moving it off of the contact members 91 and 92 and thereby opening the switch and stop the operation of the entire system.

The sequence of movements of the tool will will be seen in Figure 4, it being understood that the tool is initially not fed until it gets at its initial starting point for its initial longitudinal left hand movement on the longitudinal feeding operation.

Electrical diagram

With the general statement of electrical mechanical operation that has heretofore been made, the specific arrangement of the wiring diagram will be better understood.

After having operated the lever 35 to clamp the carriage nut on the lead screw 39, then use the lever 63 to bring the bracket 95 into engagement with the cross slide screw 93 which is mounted on the carriage for positioning the tool, then lever 50 is actuated to engage the friction clutch members 48 and 49. Thereupon, the starter button 96 is closed across the contacts 97, 98 and 99. When this is done, the relay 169 is energized closing switch members 170, 172, 173 and 174 to energize the lines connected thereto so that the feed will start to the left. When the contact members 83 and 84 are closed the switch member 169a is energized through the coil 169b which event takes place upon the closing of the starter button 96 so that the feed to the left can take place. This continues until switch 87 is closed across the terminals 88 and 89 which results in deenergizing relay 169 and opening switch members 170, 172, 173 and 174 and energizes relay 175 and closing switch members 176, 177, 178 and 179. This energizes the clutch 113—139 which gives the rapid right hand longitudinal movement. The member 176a alternately engages the switch group so that when one switch is opened the other will be closed. This is a safety feature. When the clutch member 113—139 is so energized the switch member 179 is moved to the left thereby shunting the rheostat 180 which is used through the adjustment of its arm 181 to control the rates of speed, and by this shunting of the rheostat the motor applies its full speed to the rapid right hand movement of the carriage when returning the tool to its initial starting position.

182 designates the motor relay of the motor 101. 183, 184 and 185 designate condensers for the respective magnetic clutches to which they are attached. The brush system of the magnetic clutches is shown in Figure 20 where the contact ring 186 is engaged by the respective brushes 187 and 188 supported upon the brush members 189, and 190 on the bracket 191.

Current for the motor 101 is taken from the L+ post whence it passes along the line 192 to terminal 97 and through line 193 to relay 182, thence through line 194 to motor 101. Negative current is taken from L— post through line 195 to motor 101. Current from the L+ post goes to the terminal members 97, 98 and 99 when the switch 96 has been closed and passes through line 196 to switch member 174 and thence through coil 169 back through line 197 to the L— post. This energization of coil 169 results in the closing of the switch members 170, 172, 173 and 174 as heretofore recited. Current passes from terminal 99 through the line 198, line 199 to terminal 200 of the switch member 178 and thence through that switch member through line 201 to terminal 88 of switch 87. Terminal 89 is connected to switch 96 through the stop contactor 100 to switch 90 and terminal 92—91. It is also connected through the line 201 to the coil 175 which, in turn, is connected by wire 202 to wire 197. Line 199 also leads through line 203 so as to engage with switch member 174 which is connected by line 196 to terminal 98. It is also connected to the coil 169. As the contact members 83 and 84 are closed, the relay 169b is energized through the line 204, its switch member 169a being connected to the line 205 that in turn is connected to the L+ line 192. The negative side of switch contact members 83 and 84, through the line 206 and wire 197 to the L— post. When the relay 169b is closed by having 169a engage the terminal of wire 207, it is thereby connected through wire 208 to switch member 172 and wire 209. It is also connected by a wire 210 to switch member 177.

Returning to wire 209 which is connected to switch terminal L— 3, it will be noted that that terminal has a wire 211 which is connected to the condenser 185 and through wire 212 to magnetic clutch 116. The other side of the magnetic clutch 111 is connected by wire 213 to condenser 185 and to wire 214 which in turn is connected into the motor through the wire 215 and by wire 195 to the L— post. Wire 195 is connected by wire 216 to the condenser 184 and to 113 of the magnetic clutch while the other side of the condenser 184 is connected by wire 217 to magnetic clutch 139. This clutch is in turn connected by wire 218 to terminal L— 2. The other side of the condenser 184 is connected by wire 219 to magnetic clutch 113.

The wire 220 is connected to condenser 183, one side of which is connected by wire 221 to magnetic clutch 144 and on the other side by a wire 222 to magnetic clutch 115. Magnetic clutch half 144 is connected by wire 223 to terminal L— 1 which, in turn, is connected by wire 224 with switch arm 173 that in turn is connected by wire 225 to terminal 226 on which switch arm 169a may engage.

The motor 101 has a line 227 connected to rheostat 180 while line 228 is connected from rheostat 180 to terminal 229 engaged by switch arm 179. Terminal 230 also engageable by switch arm 179 as heretofore explained and connected to line 235 is connected by wire 231 to the rheostat arm 181. Wire 232 connects wire 218 to switch arm 177 while switch arm 176 is connected on one side by a wire 233 to line 204 and on the other side by line 234 to switch terminal 83. Field relay 182 is connected into the motor by wire 235 and 236.

Method of operation

As heretofore stated, in setting up the machine tool, the screw 93 and stop 95 are brought against one another. The first stop pin 80 is then placed close to the limit switch 65 so that, when the carriage starts to feed longitudinally, switch arm 81 will come in contact with the first pin set stop 80 thus positioning the end of the shaft so that the machine will immediately start to feed out until it reaches the end of the first set stop 80 when it will start to feed longitudinally due to the fact that the arm 80 no longer holds switch arm 81 in open position. The remaining stops 80 are set at a predetermined distance depending upon the length of cut. The first set stop 80 should have its micrometer head set at zero for the first diameter. For the second diameter, the next set stop is set at a given distance depending upon the diameter required and so on until the shaft is turned. As the tool completes the last step or diameter, it will start the feed out movement until stop pin 86 strikes limit switch 87 which is set so that the tool will clear the work. This causes the tool then to traverse back longitudinally rapidly until the stop pin 86 strikes the limit switch 90 opening that switch and stopping the carriage in starting position.

This sequence of mechanical movements is premised upon a sequence of electrical connections, such as the following:

Closing the starter button 96 energizes the coil 169 and closes the four-pole contactor 170—174, and energizes 169b moving 169a over to 207.

By the intermittent opening of switch contacts 83 and 84 they alternately get the longitudinal feed to the left when magnetic clutch 111—116 is closed when switch terminals 83 and 84 are closed, or get the outward movement when the last mentioned clutch is deenergized due to the opening of switch 83 and 84 and clutch 115—144 is energized for withdrawing the tool. When the stop pin 86 finally closes the switch 87 the two clutches under consideration are both deenergized, the four-pole contactor 170—174 is open and the contactor 176—179 is closed, which results in shunting the rheostat control 180 and energizing the clutch 113—139 giving the motor full speed rapid return to the right, which continues until the stop pin 86 opens the switch 99.

It will be understood that I desire to comprehend within my invention such modifications as may be necessary to adapt it to varying conditions and uses.

Having thus fully described my invention, what I claim as new and desire to secure by Letters Patent, is:

1. In combination in a machine tool having a tool, means to support and rotate a work piece, means to actuate the tool longitudinally and transversely of the work, a switch controlling the operation of said moving means for longitudinal movement, spaced stops for intermittently actuating said switch, means for moving said tool transversely of the work by said moving means when the switch is opened by said stops, and a second switch operable at the end of the longitudinal movement when the first switch is opened to cause said tool moving means to move the tool backwardly longitudinally of the work.

2. In combination in a machine tool having a tool, means to support and rotate a work piece, means to actuate the tool longitudinally and transversely of the work, a switch controlling the operation of said moving means for longitudinal movement, spaced stops for intermittently actuating said switch, means for moving said tool transversely of the work by said moving means when the switch is opened by said stops, a second switch operable at the end of the longitudinal movement when the first switch is opened to cause said tool moving means to move the tool backwardly longitudinally of the work, and means for simultaneously accelerating the tool moving means to accelerate a rapid return.

3. In combination, a tool moving motor, a plurality of electrically-operated clutches for moving said tool laterally of the work in one direction transversely of the work and laterally of the work in the other direction, switches for controlling said electrically-operated clutches, and stop means adapted to actuate said switches at predetermined intervals, one switch engaging stops for alternate longitudinal and transverse movements and another switch engaging stops to limit longitudinal movements.

4. In combination, a tool moving motor, a plurality of electrically-operated clutches for moving said tool laterally of the work in one direction transversely of the work and laterally of the work in the other direction, switches for controlling said electrically-operated clutches, and stop means adapted to actuate said switches at predetermined intervals, one of said stop means being stationarily mounted independent of the tool for transverse and longitudinal movements of the tool and the other being mounted to travel with the tool for limiting longitudinal movements of the tool.

5. In combination, a tool moving motor, a plurality of electrically-operated clutches for moving said tool laterally of the work in one direction transversely of the work and laterally of the work in the other direction, switches for controlling said electrically-operated clutches, and stop means adapted to actuate said switches at predetermined intervals, one of said stop means being stationarily mounted independent of the tool and the other being mounted to travel with the tool, the first mentioned stop and associated switch controlling the longitudinal movement in one direction and the transverse movement of the tool and the other stop and switch means controlling the reverse longitudinal movement.

6. In combination, a tool moving motor, a plurality of electrically-operated clutches for moving said tool laterally of the work in one direction transversely of the work and laterally of the work in the other direction, switches for controlling said electrically-operated clutches, and stop means adapted to actuate said switches at predetermined intervals, one of said stop means being stationarily mounted independent of the tool and the other being mounted to travel with the tool, the first mentioned stop and associated switch controlling the longitudinal movement in one direction and the transverse movement of the tool and the other stop switch means controlling the reverse longitudinal movement, and means associated with the last mentioned switch for accelerating the return longitudinal movement.

7. In combination in a machine tool having a carriage and slide carrying the tool for longitudinal and transverse movement, and means for rotatably supporting the work piece, a motor actuating said carriage and slide, magnetic clutches for left hand longitudinal movement, right hand longitudinal movement of the carriage, and transverse movement of the tool slide, a switch for controlling the first and third clutches, stop means for actuating said switch at intervals, a second switch for controlling the right hand longitudinal clutch for return tool movement, and stop means for actuating said switch.

8. In combination in a machine tool having a carriage and slide carrying the tool for longitudinal and transverse movement, and means for rotatably supporting the work piece, a motor actuating said carriage and slide, magnetic clutches for left hand longitudinal movement, right hand longitudinal movement of the carriage, and transverse movement of the tool slide, a switch for controlling the first and third clutches, stop means for actuating said switch at intervals, a second switch for controlling the right hand longitudinal clutch for return tool movement, and stop means for actuating said switch carried by said tool.

9. In combination in a machine tool having a carriage and slide carrying the tool for longitudinal and transverse movement, and means for rotatably supporting the work piece, a motor actuating said carriage and slide, magnetic clutches for left hand longitudinal movement, right hand longitudinal movement of the carriage, and transverse movement of the tool slide, a switch for controlling the first and third clutches, stop means for actuating said switch at intervals, a second switch for controlling the right hand longitudinal clutch for return tool movement, stop means for actuating said switch carried by said tool, and a third switch for rendering the electrical system inoperative actuated by said second stop means.

10. In combination in a machine tool having a carriage and slide carrying the tool for longitudinal and transverse movement, and means for rotatably supporting the work piece, a motor actuating said carriage and slide, magnetic clutches for left hand longitudinal movement, right hand longitudinal movement of the carriage, and transverse movement of the tool slide, a switch for controlling the first and third clutches, stop means for actuating said switch at intervals, a second switch for controlling the right hand longitudinal clutch for return tool movement, stop means for actuating said switch carried by said tool, and means controlled by the second switch for accelerating the motor speed to return the carriage slide and tool to initial position.

11. In combination, in a lathe having means for rotatably supporting a work piece, a tool carriage slide and tool supported thereon, a motor, a lead screw for longitudinally moving said carriage driven thereby, a feed rod for transversely moving said tool slide driven thereby, magnetic clutches controlling the alternate direction of movement of the lead screw by the motor, a third magnetic clutch for controlling the application of the motor to the feed rod, stationary stop means on the lathe adjacent the carriage, a switch controlling the clutch for longitudinal left hand movement and transverse movement carried on said carriage engageable with said stop means at intervals, a second switch actuating pin carried by said carriage, a second switch mounted on the tool adjacent the limit of movement of the carriage engageable by said pin controlling the return right hand longitudinal movement clutch.

12. In combination, in a lathe having means for rotatably supporting a work piece, a tool carriage slide and tool supported thereon, a motor, a lead screw for longitudinally moving said carriage driven thereby, a feed rod for transversely moving said tool slide driven thereby, magnetic clutches controlling the alternate direction of movement of the lead screw by the motor and associated metering, a third magnetic clutch for controlling the application of the motor to the feed rod, stationary stop means on the lathe adjacent the carriage, a switch controlling the clutch for longitudinal left hand movement and transverse movement carried on said carriage engageable with said stop means at intervals, a second switch actuating pin carried by said carriage, a second switch mounted on the tool adjacent the limit of movement of the carriage engageable by said pin controlling the return right hand longitudinal movement clutch, and a third switch mounted on said lathe adjacent the carriage engageable by the pin carried thereby for rendering the motor inoperative.

13. In combination, in a lathe having means for rotatably supporting a work piece, a tool carriage slide and tool supported thereon, a motor, a lead screw for longitudinally moving said carriage driven thereby, a feed rod for transversely moving said tool slide driven thereby, magnetic clutches controlling the alternate direction of movement of the lead screw by the motor and associated metering, a third magnetic clutch for controlling the application of the motor to the feed rod, stationary stop means on the lathe adjacent the carriage, a switch controlling the clutch for longitudinal left hand movement and transverse movement carried on said carriage engageable with said stop means at intervals, a second switch actuating pin carried by said carriage, a second switch mounted on the tool adjacent the limit of movement of the carriage engageable by said pin controlling the return right hand longitudinal movement clutch, a third switch mounted on said lathe adjacent the carriage engageable by the pin carried thereby for rendering the motor inoperative, a rheostat for controlling the speed of said motor, and means controlled by the second switch for rendering said rheostat inoperative to accelerate the return movement of the carriage.

14. In an electric circuit, a motor, a pair of shafts, a left longitudinal magnetic clutch to connect the motor to one shaft, a right longitudinal magnetic clutch to connect the motor to the other shaft, a transverse magnetic clutch to connect the motor to said one shaft, a switch intermittently operating alternately the first and third clutches, a reversing switch rendering the first and third clutches inoperative and rendering the second clutch operative.

15. In an electric circuit, a motor, a pair of shafts, a left longitudinal magnetic clutch to connect the motor to one shaft, a right longitudinal magnetic clutch to connect the motor to the other shaft, a transverse magnetic clutch to connect the motor to said one shaft, a switch intermittently operating alternately the first and third clutches, a reversing switch rendering the first and third clutches inoperative and rendering the second clutch operative, a relay switch adaptable to be energized and closed upon closing the starter switch and opened upon the closing of the switch controlling the return clutch, and a second relay switch closed when the first relay switch is opened upon the closing of the return switch.

16. In an electric circuit, a motor, a pair of shafts, a left longitudinal magnetic clutch to connect the motor to one shaft, a right longitudinal magnetic clutch to connect the motor to the other shaft, a transverse magnetic clutch to connect the motor to said one shaft, a switch intermittently operating alternately the first and third clutches, a reversing switch rendering the first and third clutches inoperative and rendering the second clutch operative, a relay switch adaptable to be energized and closed upon closing the starter switch and opened upon the closing of the switch controlling the return clutch, a second relay switch closed when the first relay switch is opened upon the closing of the return switch, a rheostat controlling the speed of the motor, and means operable by the closing of the return switch for shunting the rheostat to increase the motor speed.

17. In a combination in a machine tool of a longitudinally movable carriage, a transversely movable slide carrying a tool mounted on the carriage, a switch carried on the slide controlling the longitudinal movement of the slide and carriage and the transverse movement of the carriage, a plurality of stationary stops mounted at spaced intervals adapted to engage said switch at intervals whereby, while the switch is engaged by a stop, the slide will move transversely, and when the switch is disengaged from a stop the carriage and slide together will move longitudinally in a given direction.

18. In combination in a machine tool of a longitudinally movable carriage, a transversely movable slide carrying a tool mounted on the carriage, a switch carried on the slide controlling the longitudinal movement of the slide and carriage and the transverse movement of the carriage, a plurality of stationary stops mounted at spaced intervals adapted to engage said switch at intervals whereby, while the switch is engaged by a stop, the slide will move transversely, and when the switch is disengaged from a stop the carriage and slide together will move longitudinally in a given direction, a switch actuating member carried by said slide, a stationary switch mounted on the machine tool bed adjacent the last of the stops whereby, while the first switch is held open by the last stop, the transverse movement of the slide will bring the stop supported by the slide into engagement with the switch supported by the tool bed to close the switch whereupon the carriage and the slide will be moved in an opposite longitudinal direction.

19. In combination in a machine tool of a longitudinally movable carriage, a transversely movable slide carrying a tool mounted on the carriage, a switch carried on the slide controlling the longitudinal movement of the slide and carriage and the transverse movement of the carriage, a plurality of stationary stops mounted at spaced intervals adapted to engage said switch at intervals whereby, while the switch is engaged by a stop, the slide will move transversely, and when the switch is disengaged from a stop the carriage and slide together will move longitudinally in a given direction, a switch actuating member carried by said slide, a stationary switch mounted on the machine tool bed adjacent the last of the stops whereby, while the first switch is held open by the last stop, the transverse movement of the slide will bring the stop supported by the slide into engagement with the switch supported by the tool bed to close the switch whereupon the carriage and the slide will be moved in an opposite longitudinal direction, a third switch stationarily mounted on the tool bed adjacent the first stop operable by the stop.

20. In combination in a machine tool of a carriage, a lead screw and a feed rod, a common motor for actuating said lead screw and feed rod, a cross slide on the carriage, stop means on the carriage and cross slide for positioning the tool, hand means for actuating the carriage and cross slide, hand means for adjusting the tool, clutch means for engaging the lead screw with the carriage, clutch means for engaging the cross slide with the feed rod, a plurality of stops mounted on the tool adjacent one end of the cross slide, a switch carried on the cross slide engageable with said stops in succession, a switch actuating pin on the cross slide, a reversing switch and a stop switch mounted at spaced intervals engageable by said pin, said switches being mounted on the tool bed.

21. In an electric circuit, a motor for feeding a tool carriage and cross slide longitudinally in one direction, a reversing switch, a rheostat for reducing the speed of the carriage and cross slide in the first longitudinal direction, and means in said circuit adapted to shunt said rheostat upon the closing of the reversing switch whereby the motor will return the cross slide and carriage to its initial position at full motor speed.

22. In an electric circuit, a motor for feeding a tool carriage and cross slide longitudinally in one direction, a reversing switch, a rheostat for reducing the speed of the carriage and cross slide in the first longitudinal direction, and means in said circuit adapted to shunt said rheostat upon the closing of the reversing switch whereby the motor will return the cross slide and carriage to its initial position at full motor speed.

23. In combination, in a machine tool having a tool, means to rotate a work piece, means to cut the work with different diameters including electrically driven means for moving the tool longitudinally and transversely of the work, said last named means including a plurality of stops, and switches controlling said electrically driven means actuated by said stops during the tool movement, whereby said tool is successively moved longitudinally and transversely of the work.

24. In combination, in a machine tool having a tool, means to rotate a work piece, means to cut the work with different faces and different diameters including electrically driven means for moving the tool longitudinally and transversely of the work, said last named means including a plurality of stops, and switches controlling said electrically driven means actuated by said stops during the tool movement, whereby said tool is successively moved longitudinally and transversely of the work.

25. In combination, in a machine tool having a tool, means to rotate a work piece, means to cut the work with different diameters including electrically driven means for moving the tool longitudinally and transversely of the work, said last named means including a plurality of adjustable stops, and switches controlling said electrically driven means actuated by said stops during the tool movement, whereby said tool is successively moved longitudinally and transversely of the work.

26. In combination, in a machine tool having a tool, means to rotate a work piece, means to cut the work with different diameters including electrically driven means for moving the tool longitudinally and transversely of the work, said last named means including a plurality of micrometer stops, and switches controlling said electrically driven means actuated by said stops during the tool movement, whereby said tool is successively moved longitudinally and transversely of the work.

27. In combination, in a machine tool having a tool, means to rotate a work piece, means to cut the work with different diameters including electrically driven means for moving the tool longitudinally and transversely of the work, said last named means including a plurality of adjustable micrometer stops, and switches controlling said electrically driven means actuated by said stops during the tool movement, whereby said tool is successively moved longitudinally and transversely of the work.

28. In combination, in a machine tool having a tool, means to rotate a work piece, means to cut the work with different diameters including electrically driven means for moving the tool longitudinally and transversely of the work, said last named means including a plurality of stops, switches controlling said electrically driven means actuated by said stops during the tool movement, and stop means for actuating said switch means whereby said tool is successively moved longitudinally and transversely of the work.

29. In combination, in a machine tool having a tool, means to rotate a work piece, means to cut the work with different diameters including means for moving the tool longitudinally and transversely of the work, said last named means including a plurality of stops, and switch means actuated by said stops during the tool movement, magnet clutches operated by said switches to control said means for moving the tool, whereby said tool is successively moved longitudinally and transversely of the work.

30. In combination, in a machine tool having a cutting tool, means to rotate a work piece relative thereto, electric power means for moving the tool longitudinally and transversely of the work, magnet clutches associated with said electric power means, a plurality of stops, switch means actuated by said stops during the tool movement, said switch means being adapted to control said magnet clutches whereby said tool is successively moved longitudinally and transversely of the work.

31. In combination, in a machine tool having a tool, means to rotate a work piece, means to cut the work with different diameters including means for moving the tool longitudinally and transversely of the work, said last named means including a plurality of stops, and switch means actuated by said stops during the tool movement, electrical feed devices operated by said switches to control said means for moving the tool, whereby said tool is successively moved longitudinally and transversely of the work.

32. In combination, in a machine tool having a cutting tool, means to rotate a work piece relative thereto, electric power means for moving the tool longitudinally and transversely of the work, electrical feed devices associated with said electric power means, a plurality of stops, switch means actuated by said stops during the tool movement, said switch means being adapted to control said electrical feed devices whereby said tool is successively moved longitudinally and transversely of the work.

33. In combination, in a machine tool having a cutting tool, a single electric motor drive, a carriage, a tool slide carrying the tool, a feed rod actuating the slide, a lead screw actuating the carriage, magnet clutches controlling the direction of movement of said rod and screw as driven by said electric motor, limit switch means operating said clutches, said switch means being actuated by the movement of the carriage and the slide.

34. In combination, in a machine tool having a cutting tool, a single electric motor drive, a carriage, a tool slide carrying the tool, a feed rod actuating the slide, a lead screw actuating the carriage, magnet clutches controlling the direction of movement of said rod and screw as driven by said electric motor, limit switch means operating said clutches, said switch means being actuated by the movement of the carriage and the slide, and a series of stops for actuating one of said switch means.

CLIFFORD A. BICKEL.

DISCLAIMER 1,937,400.—*Clifford A. Bickel*, Sidney, Ohio. MACHINE TOOLS. Patent dated November 28, 1933. Disclaimer filed August 22, 1935, by the assignee, *The Monarch Machine Tool Company*, the patentee, *Clifford A. Bickel*, concurring.

Hereby enters this disclaimer to the following claims of said Letters Patent, to wit:

Claims 1, 2, 3, 7, 8, 14, 17, 23, 24, 25, 26, 27, 28, 29, 30, 31, 32, and 34.
[*Official Gazette September 17, 1935.*]

successively moved longitudinally and transversely of the work.

28. In combination, in a machine tool having a tool, means to rotate a work piece, means to cut the work with different diameters including electrically driven means for moving the tool longitudinally and transversely of the work, said last named means including a plurality of stops, switches controlling said electrically driven means actuated by said stops during the tool movement, and stop means for actuating said switch means whereby said tool is successively moved longitudinally and transversely of the work.

29. In combination, in a machine tool having a tool, means to rotate a work piece, means to cut the work with different diameters including means for moving the tool longitudinally and transversely of the work, said last named means including a plurality of stops, and switch means actuated by said stops during the tool movement, magnet clutches operated by said switches to control said means for moving the tool, whereby said tool is successively moved longitudinally and transversely of the work.

30. In combination, in a machine tool having a cutting tool, means to rotate a work piece relative thereto, electric power means for moving the tool longitudinally and transversely of the work, magnet clutches associated with said electric power means, a plurality of stops, switch means actuated by said stops during the tool movement, said switch means being adapted to control said magnet clutches whereby said tool is successively moved longitudinally and transversely of the work.

31. In combination, in a machine tool having a tool, means to rotate a work piece, means to cut the work with different diameters including means for moving the tool longitudinally and transversely of the work, said last named means including a plurality of stops, and switch means actuated by said stops during the tool movement, electrical feed devices operated by said switches to control said means for moving the tool, whereby said tool is successively moved longitudinally and transversely of the work.

32. In combination, in a machine tool having a cutting tool, means to rotate a work piece relative thereto, electric power means for moving the tool longitudinally and transversely of the work, electrical feed devices associated with said electric power means, a plurality of stops, switch means actuated by said stops during the tool movement, said switch means being adapted to control said electrical feed devices whereby said tool is successively moved longitudinally and transversely of the work.

33. In combination, in a machine tool having a cutting tool, a single electric motor drive, a carriage, a tool slide carrying the tool, a feed rod actuating the slide, a lead screw actuating the carriage, magnet clutches controlling the direction of movement of said rod and screw as driven by said electric motor, limit switch means operating said clutches, said switch means being actuated by the movement of the carriage and the slide.

34. In combination, in a machine tool having a cutting tool, a single electric motor drive, a carriage, a tool slide carrying the tool, a feed rod actuating the slide, a lead screw actuating the carriage, magnet clutches controlling the direction of movement of said rod and screw as driven by said electric motor, limit switch means operating said clutches, said switch means being actuated by the movement of the carriage and the slide, and a series of stops for actuating one of said switch means.

CLIFFORD A. BICKEL.

DISCLAIMER 1,937,400.—*Clifford A. Bickel*, Sidney, Ohio. MACHINE TOOLS. Patent dated November 28, 1933. Disclaimer filed August 22, 1935, by the assignee, *The Monarch Machine Tool Company*, the patentee, *Clifford A. Bickel*, concurring.

Hereby enters this disclaimer to the following claims of said Letters Patent, to wit:

Claims 1, 2, 3, 7, 8, 14, 17, 23, 24, 25, 26, 27, 28, 29, 30, 31, 32, and 34.

[*Official Gazette September 17, 1935.*]

DISCLAIMER 1,937,400.—*Clifford A. Bickel*, Sidney, Ohio. MACHINE TOOLS. Patent dated November 28, 1933. Disclaimer filed August 22, 1935, by the assignee, *The Monarch Machine Tool Company*, the patentee, *Clifford A. Bickel*, concurring.

Hereby enters this disclaimer to the following claims of said Letters Patent, to wit:

Claims 1, 2, 3, 7, 8, 14, 17, 23, 24, 25, 26, 27, 28, 29, 30, 31, 32, and 34.
[*Official Gazette September 17, 1935.*]